Nov. 29, 1955  C. A. KUHNE ET AL  2,725,450
INDUCTION HEATING FURNACE
Filed Aug. 16, 1952

WITNESSES:
John E. Hensley
Leon M. Garman

INVENTORS
Clarence A. Kuhne and
John A. Redmond
BY
F. E. Browder
ATTORNEY

United States Patent Office 2,725,450
Patented Nov. 29, 1955

2,725,450

INDUCTION HEATING FURNACE

Clarence A. Kuhne and John A. Redmond, Baltimore, Md., assignors to Westinghouse Electric Corporation, East Pittsburgh, Pa., a corporation of Pennsylvania Application August 16, 1952, Serial No. 304,804

2 Claims. (Cl. 219—10.69)

Our invention relates to induction heating apparatus and in particular relates to an arrangement for heating metal bodies of irregular cross section to uniform temperature.

It is current practice in induction heating of metallic bodies having lengths large relative to their lateral dimensions to move them, in a direction parallel to their longitudinal axis, through the center of a helical heating coil carrying high frequency electric currents. This coil induces in the metallic bodies currents which circulate in planes normal to their longitudinal axis, and principally confined to the metal adjacent the surface by the well known skin-effect, the metal body being thus heated to the desired temperature.

The above-described procedure has been found to be quite satisfactory for heating bar or strip material of uniform or only slowly varying cross section, but when applied to the heating of forged ingots or other units having sharply varying cross sections like the gas turbine billet shown in our drawings, it is found to produce non-uniform surface temperatures.

One object of our invention is to provide a novel arrangement for induction heating of bodies of non-uniform cross section.

Another object is to provide an improved arrangement for supporting bodies being heated in the interior of an induction heating coil.

Still another object is to provide an improved means for moving bodies being heated through the heater coil of an induction heater.

Yet another object is to provide an improved continuous process apparatus for induction heating of metal billets in quantity production.

Other objects of our invention will become apparent upon reading the following description taken in connection with the drawings, in which.

Figure 1:
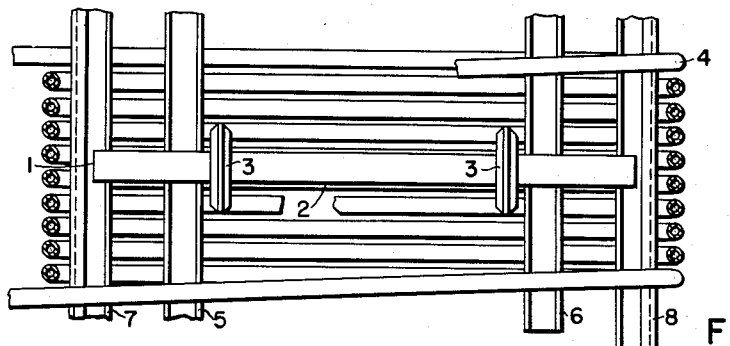
Figure 1 is a plan view partly in section, of the portion of interest, of an induction heating furnace embodying the principles of our invention.

Referring in detail to the drawings, a typical example of a body having a sharply varying cross section is the billet 1, a forging for a gas turbine blade, which has a length much greater than any of its lateral dimensions, but also has lateral dimensions which vary abruptly from the diameter of its shaft 2 to the much larger diameter of its collars 3.

Anyone following conventional induction heating practice, who wished to heat one, or a series, of billets like 1, would build a helical heater a little larger in inside diameter than the collars 3 and pass the billets lengthwise along the axis of and through the helix, energizing the latter meanwhile with high frequency current. Experiment has shown that such a procedure results in non-uniformity of surface temperature in the billets, because of non-uniformities of current density and heat outflow in the portions 2 and 3.

However, tests have also shown that if the billet is passed through a heating helix with its long axis perpendicular to the axis of the helix, its temperature is substantially the same all over its surface, presumably because the current path follows the surface layers around the contour of the body. Therefore, the heater helix carrying high frequency current is made of such form and dimensions that the billet 1 may be moved through it in a direction perpendicular to the billet axis.

The helix 4 may be made up from copper tubing through which a cooling fluid is pumped from a reservoir (not shown). To support the billet 1 and advance it in the direction of the axis of helix 4, a pair of stationary rails 5, 6 and a pair of movable rails or "walking beams" 7, 8 are provided which pass through the helix 4 parallel to the axis thereof. The stationary rails 5, 6 are provided with notches in which the billets 1, being of circular section will find rest points. Similar notches are made in the inner side walls of "walking beams" 7 and 8.

The walking beams 7, 8 move the billets along from one set of notches in rails 5 and 6 to the next set periodically, thus entering the billets 1 at one end of helix 4 and moving them through it and out at the other end. In this way, any desired number of billets may be passed through the furnace seriatim, all being subjected to the same heat treatment.

To carry out this operation, the walking beams 7, 8 are first lifted upward at both ends through a distance such that they engage and lift the two ends of the billet 1 from the notches in rails 5 and 6. The walking beams 7, 8 then move roughly parallel to the axis of helix 4 through a distance equal to the distance between the work receiving notches in rails 5 and 6, and then move downward lowering the billet into the next set of notches, and losing engagement with billet 1. The walking beams then move backward to their original position, after which they rise again to lift billets 1 for a second time and repeat the above-described cycle of operation. The billet 1 is thus advanced by intermittent steps through the helix 4 and delivered to any desired conveyor (not shown) at the output end of the heater.

Figure 2:
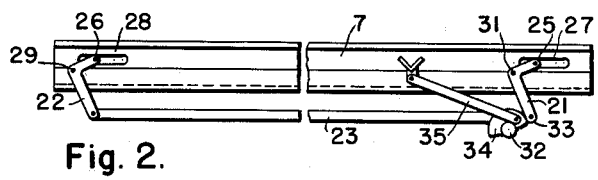
Fig. 2 is a side view of the mechanical arrangement which provides the motion necessary to feed the parts to be heated through the coil.

The above-described movement may be imparted to walking beams 7, 8 by a set of bell-crank levers 21, 22, shown in Fig. 2, connected by a link 23 and having bearing pins 25, 26 which project into slots 27, 28 in the walking beams. The pivots 29, 31 for the bell-crank levers 21, 22 are supported on the machine frame, as is also a shaft 32 rotated by a motor (not shown). A cam-follower 33 on bell-crank lever 21 bears on a cam 34 on shaft 32, and a second link 35 interconnects pivot pins on the walking beam 7 and the cam 34. When the shaft 32 rotates, the movement described above is imparted to walking beams 7 and 8.

Figure 3:
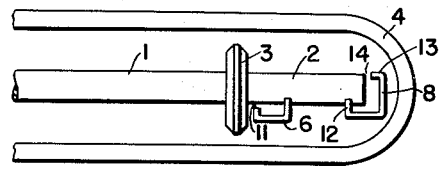
Fig. 3 is a partial end view of the furnace of Fig. 1.
Figure 4:
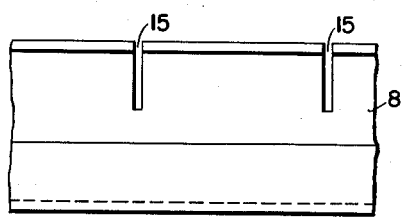
Fig. 4 is a detail view of a portion of a support member in Fig. 1.

As will be seen from Fig. 3, rails 5 and 6 are of channel section, except that the inner side of the channel is made shorter than the outer or notched side. The magnetic field due to current flow in helix 4 is normal to the plane of Fig. 3, and if both side walls of the channels 5, 6 made contact with the billet 1, this magnetic field would induce current flow around closed paths in the plane of Fig. 3, such paths comprising the channel and the contiguous portion of billet 1. Such heating of rails 5 and 6 is unnecessary and undesirable, and to prevent it the inner wall of channels 5, 6 are shortened to leave a gap 11.

Both rails 5, 6 and "walking beams" 7, 8 are heated by the adjacent portions of billet 1, and this heating of the side wall 12 of the "walking beams" tends to warp and distort them unless it is balanced by heat inflow to the other side of the beam. To insure this balance, the other side wall is turned over to provide a lip 13 nearly, but not quite touching the end of billet 1. The magnetic field due to helix 4 would cause currents to circulate around a path comprising channel section 8 and the end portion of billet 1, were it not that a small gap 14 is provided for between lip 13 and the end of billet 1.

Any difficulty from remnant unbalance in the heating of the walls of walking beam 8 adjacent the gap 14 may be avoided by making saw cuts 15 in walking beam 8, for example, at the root of each work receiving notch therein.

To give a specific example of the use of our invention, gas turbine blade billets 11″ long with a shaft diameter of ⅝″ and a collar diameter of 1 5/16″ may be heated to 1100° C. by a helix which encloses a core space 2″ by 13″ and 13¾″ long. This helix is made up from ¾″ square copper pipe and carries current of up to 600 amperes at a frequency of 10,000 cycles per second. The billet is moved through the helix in 1½ inch steps in about 135 seconds. There are nine billets in the coil at one time. The rails 5, 6 and "walking beams" 7, 8 are made up from "Hastelloy C" steel bars three thirty-seconds of an inch thick containing approximately 53% Ni, 6% Fe, 19% Mo, 17% Cr and 5% W.

Tests show that rails of the above-described material and dimensions are heated much less by the high frequency magnetic field in which they are positioned than would bars of ordinary steel, or than would even bars of the same material of greater thickness. Thus they are found to heat in a field like that described for use in this furnace to less than 600° F. while a ½″ x 1″ bar heated to nearly 1700° F.

We claim as our invention:

1. An induction heating furnace for conducting bodies which respectively have an abruptly varying cross section and a length dimension which is larger than the greatest cross-sectional dimension thereof, said furnace comprising a heating helix having an axis and means to supply said helix with high frequency current, said helix having a cross section taken in a plane perpendicular to said axis which has a larger dimension in one direction than any dimension in any other direction, two stationary supports of channel section positioned within said helix and parallel to its axis, each of said supports having first and second side walls, said supports being positioned to support with respectively said first side walls each of said bodies with its length dimension along said larger dimension of the helix and such that gaps are left between the respective second side walls and each body, and a walking beam of channel section having first and second channel walls, said walking beam being disposed to lift each body from said stationary supports on the edge of the first channel side wall and move to carry the latter said body along said axis while leaving a gap between the second side wall and the latter said body.

2. An induction heating furnace for conducting bodies which have an abruptly varying cross section and a length dimension which is larger than the greatest cross-sectional dimension, said furnace comprising a heating helix having an axis and means to supply the helix with high frequency current, said helix having a cross section taken in a plane perpendicular to said axis which has a larger dimension in one direction than in any other direction thereof, two stationary supports of channel section within said helix and positioned parallel to its axis, said supports being positioned to support each of said bodies with its length dimension along said larger dimension of the helix, each of said supports having a first and a second side wall, with the first side wall supporting each of the bodies and with a space gap left between the second side wall and each of the bodies, and a walking beam of channel section having at least a first and second channel side wall, with said beam being disposed to lift each of the bodies from stationary supports on the edge of the first channel side wall and having a heat-absorbing flange along the second channel side wall.

References Cited in the file of this patent
UNITED STATES PATENTS

| | | |
|---|---|---|
| 1,272,918 | Cram | July 16, 1918 |
| 1,335,453 | Nilson | Mar. 30, 1920 |
| 1,861,869 | Long | June 7, 1932 |
| 2,010,295 | Dreffein | Aug. 6, 1935 |
| 2,052,010 | Bailey | Aug. 25, 1936 |
| 2,085,103 | Lee | June 29, 1937 |
| 2,335,601 | Mount | Nov. 30, 1943 |
| 2,468,796 | Wood et al. | May 3, 1949 |
| 2,549,930 | Riegel et al. | Apr. 24, 1951 |

FOREIGN PATENTS

| | | |
|---|---|---|
| 662,581 | Great Britain | Dec. 5, 1951 |